UNITED STATES PATENT OFFICE.

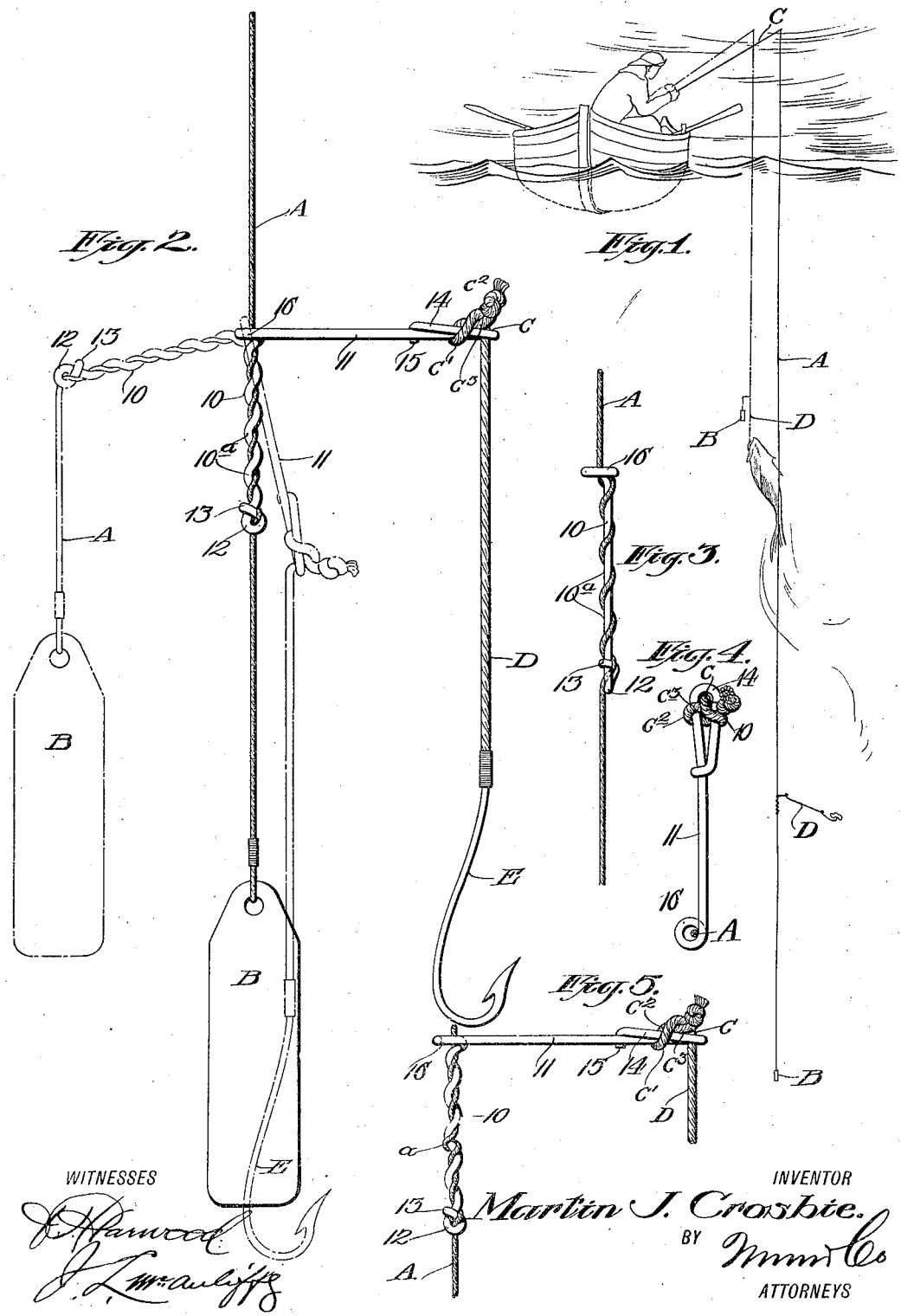

MARTIN J. CROSBIE, OF NEW YORK, N. Y.

FISHLINE ATTACHMENT.

1,351,625.   Specification of Letters Patent.   Patented Aug. 31, 1920.

Application filed February 11, 1920. Serial No. 357,971.

*To all whom it may concern:*

Be it known that I, MARTIN J. CROSBIE, a citizen of the United States, and a resident of the city of New York, borough of Manhattan, in the county and State of New York, have invented a new and Improved Fishline Attachment, of which the following is a description.

My invention although particularly adapted for use in connection with a fish line for attaching a leader or snell thereto is adapted for other uses involving conditions similar to those obtaining in the use of fishing tackle.

The general object of my invention is to provide an attaching device of the indicated character improved in various particulars to function in a distinctive manner and whereby important advantages and new results are obtained which will best be understood and appreciated when stated in connection with a description of the structural elements entering into a practical embodiment of the invention as hereinafter given.

Reference is to be had to the accompanying drawings forming a part of this specification, it being understood that the drawings are merely illustrative of one example of the invention.

Figure 1 is a diagrammatic view to be hereinafter referred to in describing the mode of functioning of my improved attaching device when applied to a fish line in a particular manner;

Fig. 2 is an elevation of an attaching device embodying my invention showing the same in use with a fish line and snell;

Fig. 3 is a side view of the attaching device taken at right angles to Fig. 2;

Fig. 4 is a plan view of the attaching device;

Fig. 5 is a fragmentary side elevation of the attaching device applied to the line, the view corresponding with the position of the device shown in Fig. 2, but illustrating a different mode of engaging the line therewith.

In carrying out my invention in accordance with the illustrated example, the attaching device is made up of an elongated line-engaging member 10 and a lateral arm 11 which may be said to be the load arm, said member 10 being adapted to be engaged with a line A, here shown as having a sinker B constituting a weight holding the line under tension when the line is secured at its upper end as for example to a fishing rod indicated conventionally at C in Fig. 1. The letter D indicates a snell suspended from the terminal loop 14 of arm 11, and here shown as a cord snell, a fish hook, E, being shown on said snell.

The member 10 substantially throughout the length thereof or for its major portion is given a zig-zag form, that is to say, it bends alternately in opposite directions and in the same plane as will be clear from a comparison of Figs. 2 and 3. In practice, the line A is wrapped about the member 10 in the zig-zag bends thereof, thereby effecting a frictional engagement between said member and the line sufficient to retard or prevent the relative sliding of the member 10 along the line. When the line is simply wrapped about the member 10 in a way to correspond with the bends thereof or with most of the bends, the member 10 may be forcibly slid along the line for positioning it at the desired point, as for example in disposing the hook E at the proper distance from the sinker B, the hooking of some fish requiring the hook to be close to the sinker while in other cases the hook is required to be a substantial distance above the sinker. If it is desired to positively hold the member 10 against longitudinal movement, the line A may be given an extra wrap as at $a$, Fig. 5, about one or more of the bends 10$^a$ of the member 10. When the member 10 is not positively held against longitudinal movement but has substantial frictional engagement with the line, if a fish of considerable weight be hooked, his activities will result in a gradual working of the member 10 downwardly along the line A toward the sinker B as will be clear from a comparison of the lower snell D of Fig. 1 with the upper snell. In this way by the time the fish has been raised to the surface he will occupy a position close to the sinker thereby facilitating the lifting of the fish and sinker over the gunwale of a boat or over the rail of a party boat as will be readily understood by experienced fishermen, particularly those having experience in ocean fishing.

At the lower end of the attaching member 10 the same is formed with a loop or eye 12 through which the line passes and said loop is so formed as to present a tensioning member 13 transverse to the member 10 and over which tensioning member the line A is passed from the eye 12 to the zig-zag bends $10^a$, the described arrangement resulting in a desirable friction on the line to retard the slipping of the member 10.

My improved attaching device at the juncture of the line-engaging member 10 and the lateral arm 11 has a novel formation, whereby as the device is rocked by a pull or load on the arm 11, said arm will have an arcuate movement with a point on the line as a center so that the end of said lateral arm adjacent to said member 10 will not describe an arc remote from the center of movement, the purpose being to cause the pull to be direct on the line instead of the force of the pull being effective on the base of the arm 11 at a point remote from the center of movement and therefore not directly with the line. For the indicated purpose, a loop 16 is produced in the attaching device at that end of the member 10 opposite the loop 12 and integral at one terminal with said member, the arm 11 merging into said loop 16 at the opposite end and departing laterally directly from said transverse loop. The loop 16 presents an eye in a plane transverse to the length of the member 10 through which loop the cord A passes to the bends $10^a$. The dotted lines in Fig. 2 indicate approximately the positions of the arm 11 and member 10 when a fish of substantial weight is hooked and it will be observed by comparing the dotted-line and full-line positions of the attachment in Fig. 2, that said attachment in the dotted line position is swung through an arc, the center of movement being a point on the line directly at the loop 16 and also, directly at the base or inner end of the lateral arm 11. Thus, the pull on the arm 11 is effective directly on the line A and this direct pull on the line holds true the moment the weight of the fish is imposed on the arm 11, the tugging of the fish being directly transmitted to the line, the direct pull being maintained as the arm 11 swings toward a position in alinement with the line.

With the described construction, moreover, a further important result is obtained in that the snell is maintained until the fish is hooked in a position offset laterally from the line, so that the bait offers better lure and affords the fish every opportunity to take the bait and as the fish is hooked and the attachment swings through an arc with the loop 16 as a center, the line and sinker are also carried laterally so that the same distance is maintained at all times between the line and the hook, and at no time is the snell in a position to become twisted about the line. Moreover, it is to be noted that the bending strain on the lateral arm 11 is transmitted to the loop 16 and distributed torsionally throughout said loop, thereby not only contributing a desirable limited resiliency to said arm but resulting also in preventing localized crystallization and breaking of the arm by constant bending at a definite point therein.

Instead of, or in addition to, wrapping the line a plurality of times about a given bend or bends $10^a$ as at $a$, the line may be given a twist or hitch at the loop 16 but this is usually unnecessary. The twists $a$ are the most advantageous way of using the device as the twists will allow the line to pass freely through the loop 16, the transverse disposition of which permits of the line automatically passing into said loop as the line leaves the uppermost bend $10^a$ of member 10.

The loop 14 of arm 11 is elongated and preferably disposed horizontally having reference to the position of the attachment when on the line. The material forming the loop is made to cross the arm 11 and having its terminal 15 downwardly disposed at a side of said arm. The snell (or leader) may be secured to the loop 14 in any approved way, the illustration showing a form of tackle hitch in which the snell D passes upwardly through the loop as at $c$, then is carried laterally to the outside of the loop at $c'$ and given a bend $c^2$ about the exterior of said loop at the under side, the free end $c^3$ which usually is knotted as shown, being passed beneath the material of the snell at the bend formed by the member $c'$.

In applying the attachment to a line, the line is passed laterally into the lower eye 12 and over the tensioning member 13. The member 10 is then disposed at approximately right angles to the line so that the arm 11 will lie in a plane approximately parallel with the line and said arm 11 is then turned after the manner of a crank, thereby wrapping the line in the bends of the member 10. Similarly, in detaching the fish from the line, the arm 10 is swung at right angles or approximately so to the line and the arm 11 turned reversely as a crank arm.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A line attachment comprising an elongated line-engaging member, and a lateral arm thereon at an end thereof, said attachment presenting a laterally disposed line-receiving open loop at the juncture of said line-engaging member and said arm and in a plane approximately at right angles to the line-engaging member, said arm departing laterally from said loop so that one side of the loop is formed by said arm, whereby the attachment when a weight is imposed on the lateral arm will swing through an arc having its center directly at said loop and therefore directly at the inner end of the lateral arm.

2. A line attachment including a line-engaging member, a lateral arm at one end of said member, and a loop through which the line may pass, said loop being integral at one end with said line-engaging member and disposed in a plane transverse to said member, and said arm being integral at its inner end with the opposite end of said loop and extending directly outward laterally therefrom.

3. A line-attachment including an elongated line-attaching member, terminating at one end in a loop lying in a plane transverse to said member through which loop a line may pass, and run directly along said member from said loop, and an arm integral with said loop and extending directly therefrom laterally, so that any swinging movement of the attachment on the line will be at the point thereof passing through said loop and directly adjacent to the inner end of said arm.

MARTIN J. CROSBIE.